Jan. 7, 1958 H. E. THOMAS 2,819,392

SWEEP WAVE GENERATOR

Filed Nov. 22, 1952

INVENTOR
HARRY E. THOMAS
BY Percy P. Lantzy
ATTORNEY

United States Patent Office 2,819,392

Patented Jan. 7, 1958

2,819,392

SWEEP WAVE GENERATOR

Harry E. Thomas, Montclair, N. J., assignor to International Telephone and Telegraph Corporation, a corporation of Maryland Application November 22, 1952, Serial No. 321,984

9 Claims. (Cl. 250—27)

Figure 1:
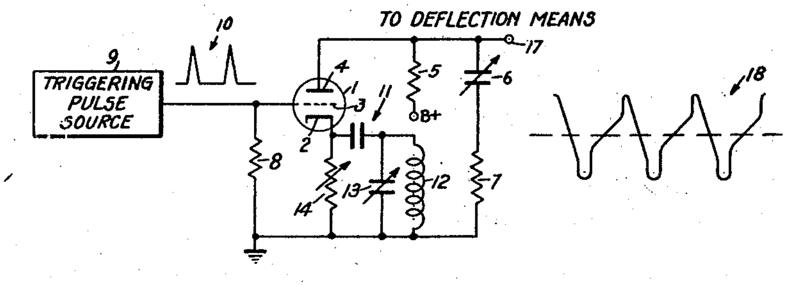

This invention relates to electric wave generation and more particularly to such generation as may be employed to produce sweep waves characterized by a controllable linearly rising waveform.

Where a beam of electrons is generated and directed against a target electrode, some means is normally provided for causing deflection of this cathode ray beam in two different directions in order that the cathode ray beam may be caused to scan or traverse the desired portion of the target electrode. In a television camera or receiver, the electron beam is deflected at a slow speed, usually in a vertical direction, and at a high speed, usually in the horizontal direction. The high speed deflection provides line scanning, and the low speed deflection provides field or frame scanning. In oscillographic devices the cathode ray beam is usually deflected horizontally at a predetermined rate while the beam is deflected vertically in accordance with the potential variation to be observed. In these instances of beam deflection, it is generally desirable that the cathode ray beam be deflected uniformly with respect to time, and accordingly, some means must be provided for producing such deflection voltages. Since it is desired that the beam be deflected uniformly with respect to time, the applied deflection voltage should appear approximately as a sawtooth waveform or be of such shape as to produce a current of sawtooth waveform in an inductance. Furthermore, this sweep wave must be characterized by a high degree of linearity in order that the image appearing on the cathode ray screen may be a substantially accurate reproduction of the impressed signal.

The usual sawtooth wave generator is driven into conduction by sync or triggering pulses in order to allow the anode of the generating tube to assume a low potential and thereby discharge the tank capacitor through the tube to ground. Recharging of this condenser through the plate load resistor generates a conventional sawtooth of voltage, the form thereof depending upon the value of plate resistor and the discharge capacitor. Deficiencies and linearity of such generated sawtooth waveforms occur at the ends of the sweep, the lower end due to the discharging of the capacitor and the upper end where the charging rate of the capacitor decreases prior to reaching its static level. The non-linearity existing at the upper end of the sweep waveform may also be limited by supplying the capacitor through some constant current source or by raising the supply voltage so that the sawtooth waveform is formed in a lower voltage portion of the charging current range. However, the control of the linearity at the start of the sawtooth waveform is not easily attained.

In some cathode ray tube systems, particularly in the magnetic deflection type, a desired current wave of substantially sawtooth shape is generated in a sweep generator which is then applied across the deflection means, plates, coils, or a yoke, through means of an amplifier and reactance devices, such as a transformer. Both the amplifier and reactance devices normally are prone to distort the applied sweep wave, the deflection thereby ceasing to be linear regardless of the linearity of the applied sweep wave. Under these conditions it is advantageous to be able to control the linearity of the entire excursion of the wave emitting from the sweep wave generator to allow preshaping of the sweep wave in a manner to compensate for non-symmetrical and non-linear circuitry in the succeeding portions of a deflection system.

An object of this invention, therefore, is to provide a circuit for the generation of sweep waves whereby said sweep wave may be preshaped to compensate for non-symmetrical and non-linear circuitry succeeding the sweep generator.

A feature of this invention is the provision of a damped tuned circuit disposed in the cathode circuit of a sweep wave generating device to cause damped oscillations to be superimposed upon the sawtooth waveform generated in the plate circuit, the components therein being controllable to enable the preshaping of the resultant sweep wave output to compensate for non-symmetrical and non-linear circuitry in deflection means succeeding the sweep wave generator.

Figure 2:
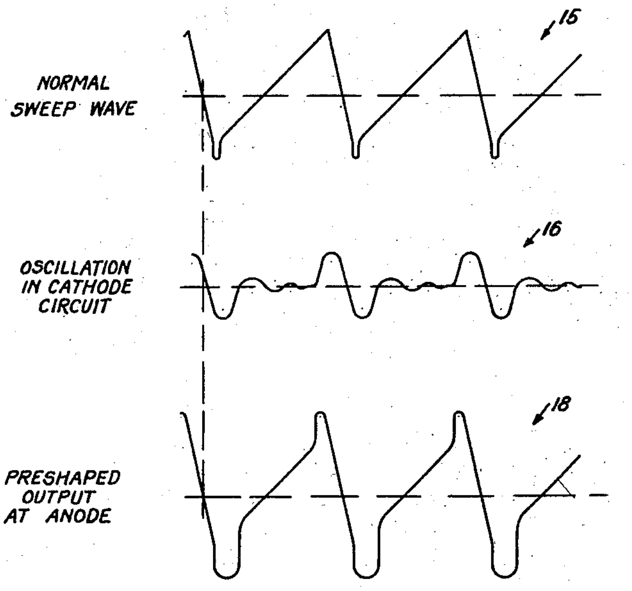

The above-mentioned and other features and objects of this invention will become more apparent by reference to the following description taken in conjunction with the accompanying drawings, in which:

Fig. 1 is a schematic circuit diagram illustrating a sweep wave generator in accordance with the principles of this invention; and Fig. 2 is a representation in graphic form of certain operating conditions of the circuit of Fig. 1.

Referring to the circuit diagram of Fig. 1, a sweep voltage generator is illustrated comprising an electron discharge device 1 including at least a cathode 2, a control grid 3, and an anode 4. The anode 4 is illustrated as being connected to a high voltage source through a load resistor 5 and further includes a variable discharge condenser 6 and a peaking resistor 7 returned to ground. The preshaped sweep wave output available from this circuit for application to further elements of a deflection system is removed from the junction of the load resistor 5 and the discharge capacitor 6.

The control grid 3 is returned to ground by means of the grid-leak resistor 8. Further, the sweep wave voltage generated by the sweep wave generator of this invention is originated by the application of appropriately timed triggering pulses applied from source 9 as shown at 10. Controlling the timing of the triggering pulses 10 and the value of capacitor 6 provides means of generating a sweep wave having a predetermined repetition rate and slope for a particular application, such as the horizontal and vertical sweep voltage for television and the like apparatus. The cathode 2 is returned to ground by means of a damped tuned circuit 11 including an inductance 12, a parallel connected variable condenser 13, and a variable damping resistor 14 all of suitable value such that when the main sawtooth shaped sweep wave of predetermined repetition rate is initiated by the rapid discharge of capacitor 6 upon the conduction of device 1, a damped oscillation is initiated which becomes superimposed upon the sawtooth waveform generated in the anode circuit for application to a desired deflection system. Normally the sawtooth waveform, initiated by the discharge of condenser 6 through device 1 and the charging of condenser 6 from B+ through resistor 5, where a peaking resistor 7 is employed, would produce a sawtooth waveform substantially as shown in curve 15 of Fig. 2. With a circuit arrangement as illustrated in Fig. 1 the tuned circuit 11 will be actuated with a current of proper phasing to cause ringing therein and thereby generate a damped oscillation as illustrated in curve 16 of Fig. 2. The output at point 17 in the anode circuit of device 1 is a superposition of the voltages illustrated by curves 15 and 16 to produce a waveform illustrated in curve 18 of Figs. 1 and 2 having steepened portions at the extremes of the excursion of the sweep waveform. The amount to which the waveform is steepened and the linearity in between such steepened ends may be controlled by the value of the damping resistor 14 shunting the parallel tuned circuit 11. The frequency at which tuned circuit 11 will resonate and the amount of damping resistance contributed by resistor 14 will depend largely upon the application to which the sweep generator will be employed. For application in a horizontal deflection circuit of a TV system this resonance is preferably approximately 70 kc. in about a seven microsecond negative excursion of the sawtooth during retraced time.

Therefore, variable condenser 13 allows for adjustment of the tuned circuit for the desired resonance which cooperates with the repetition rate or the sweep wave while varying resistor 14 allows control of the steepening at the ends of the sawtooth and is preferably controlled to be proportioned so that an unequal amount of steepening exists at either end of the excursion. Such an arrangement is useful to preshape the sweep waveform to compensate for, and in an overall aspect substantially eliminate the effect of non-symmetrical circuitry encountered further on in any given deflection system. Providing condenser 6 with means to adjust the value thereof enables control of the slope of the linear portion of the sweep waveform in a desired manner. Further, by providing means to steepen the right hand end of the sweep waveform it is possible to compensate for the normal exponential decrease in the rate of charging the condenser 6 and thereby enable the employment of a lower anode voltage for a given degree of linearity.

While I have described above the principles of my invention in connection with specific apparatus, it is to be clearly understood that this description is made only by way of example and not as a limitation to the scope of my invention as set forth in the objects thereof and in the accompanying claims.

I claim:

1. A sweep wave generator comprising a vacuum-type electron discharge device having an anode, a cathode, and a control grid, a reference potential, an input circuit coupled between said control grid and said reference potential, means coupling timed trigger pulses to said input circuit to time the conduction of said device, a series resistance-capacitance time constant network coupled between said anode and said reference potential to provide a substantially linear sawtooth wave at said anode, a resonant network responsive to the conduction of said device coupled between said cathode and said reference potential, the conduction of said device ringing said resonant network to produce oscillations therein which are combined with said sawtooth wave at said anode to provide a composite sweep wave having steepened extremities and a linear central portion, an adjustable means included in said resonant network to control the amplitude of the oscillation and thereby the steepness at the extremities of said composite wave, and an output means coupled to said anode across the entire resistance-capacitance time constant network to remove said composite wave.

2. A sweep wave generator comprising a normally non-conductive vacuum-type electron discharge device having at least an anode, a cathode, and a control grid, a reference potential, an oscillatory means coupled between said cathode and said reference potential, an adjustable means included in said oscillatory means to control the energy thereof, a series resistance-capacitance time constant means coupled between said anode and said reference potential, an input circuit coupled between said control grid and said reference potential to bias said device into non-conduction, a means coupled to said input circuit to cause a timed sequence of conduction of said device to initiate the operation of said time constant means and said oscillatory means to produce at said anode a composite sweep wave having steepened extremities and a linear central portion, and an output means coupled to said anode across the entire resistance-capacitance time constant network to remove said composite wave.

3. A generator according to claim 2, wherein said time constant means includes a first variable condenser, the discharge current thereof through said device when made conductive initiating damped oscillation in said oscillatory means for superimposition upon the extremities of the substantially linear sawtooth wave developed by the charging and discharging of said first condenser thereby forming said composite wave available at said anode.

4. A generator according to claim 3, wherein said oscillatory means comprises an inductance, a second variable condenser, and an adjustable damping resistance arranged in a parallel combination and excited by the discharge of said first condenser to superimpose a damped oscillation upon the extremities of said sawtooth wave, said damping resistance providing said adjustable means to control the steepness of the extremities of said composite wave.

5. A generator according to claim 2, wherein said oscillatory means is excited by the discharge of the capacitance of said time constant means to generate said composite wave having the steepness of the extremities thereof controlled by said adjustable means.

6. A generator according to claim 5, wherein said oscillatory means includes a resonant circuit and said adjustable means comprises an adjustable damping resistor in shunt relation to said resonant circuit.

7. A generator according to claim 6, wherein said resonant circuit includes a parallel arrangement of an inductance and a variable capacitance.

8. In an electron beam deflection system, a sweep wave generator comprising a vacuum-type electron discharge device having at least an anode, a cathode and a control grid, a reference potential, an input circuit coupled between said control grid and said reference potential, means coupling timed triggering pulses to said input circuit to time the conduction of said device, a resonant network coupled between said cathode and said reference potential, adjustable means included in said resonant network to control the oscillatory energy therein, a series resistance-capacitance network coupled between said anode and said reference potential, the conduction of said device discharging said time constant network therethrough in proper phase relationship to initiate damped oscillations in said resonant network to thereby produce at said anode a composite sweep wave having steepened extremities and a linear central portion, and an output means coupled to said anode across the entire resistance-capacitance time constant network to remove said composite wave.

9. A system according to claim 8, wherein said resonant network comprises a parallel arrangement of an inductance, a variable condenser, and a damping resistor, said damping resistor providing said adjustable means in said resonant network to enable the preshaping of said composite wave.

References Cited in the file of this patent

UNITED STATES PATENTS

| | | |
|---|---|---|
| 2,277,000 | Bingley | Mar. 17, 1942 |
| 2,288,554 | Smith, Jr. | June 30, 1942 |
| 2,496,283 | Gall | Feb. 7, 1950 |
| 2,543,428 | Wendt et al. | Feb. 27, 1951 |
| 2,561,817 | Parker | July 24, 1951 |
| 2,610,298 | Zaloudek | Sept. 9, 1952 |
| 2,631,240 | Gruen | Mar. 10, 1953 |
| 2,633,554 | Tourshou | Mar. 31, 1953 |